United States Patent
Meyer et al.

(10) Patent No.: US 9,272,373 B2
(45) Date of Patent: Mar. 1, 2016

(54) DEVICE FOR ASSEMBLING BRACKETS IN AN AIRCRAFT STRUCTURE

(71) Applicant: AIRBUS OPERATIONS (S.A.S.), Toulouse (FR)

(72) Inventors: Cedric Meyer, Fonsorbes (FR); David Bourbon, Larra (FR)

(73) Assignee: AIRBUS OPERATIONS (S.A.S.), Toulouse (FR)

(*) Notice: Subject to any disclaimer, the term of this patent is extended or adjusted under 35 U.S.C. 154(b) by 402 days.

(21) Appl. No.: 13/683,055

(22) Filed: Nov. 21, 2012

(65) Prior Publication Data
US 2013/0192045 A1 Aug. 1, 2013

Related U.S. Application Data

(63) Continuation of application No. PCT/FR2011/051158, filed on May 23, 2011.

(30) Foreign Application Priority Data

May 25, 2010 (FR) .................................... 10 54037

(51) Int. Cl.
*B64F 5/00* (2006.01)
*B23P 11/00* (2006.01)
*G01C 15/02* (2006.01)

(52) U.S. Cl.
CPC ............... *B23P 11/00* (2013.01); *B64F 5/0009* (2013.01); *G01C 15/02* (2013.01); *Y10T 29/49895* (2015.01); *Y10T 29/53004* (2015.01)

(58) Field of Classification Search
CPC .... G01C 25/00; B64F 5/0009; G05B 19/402; G01B 11/03; H01S 5/02236; F16M 11/16; Y10T 29/4978; Y10T 29/49778; Y10T 29/49963
USPC .................. 248/168, 177.1, 169, 170, 171
See application file for complete search history.

(56) References Cited

U.S. PATENT DOCUMENTS

| | | | | |
|---|---|---|---|---|
| 2,297,980 A | * | 10/1942 | Perkins | 248/171 |
| 5,446,801 A | * | 8/1995 | Itsuzaki et al. | 382/141 |
| 2002/0171821 A1 | | 11/2002 | Cloud | |
| 2005/0172470 A1 | * | 8/2005 | Cobb et al. | 29/407.1 |
| 2010/0201972 A1 | * | 8/2010 | Marsh et al. | 356/152.1 |

FOREIGN PATENT DOCUMENTS

| | | |
|---|---|---|
| EP | 0 465 239 | 1/1992 |
| JP | 2003/039347 | 2/2003 |
| WO | WO 2011/148085 | 12/2011 |

OTHER PUBLICATIONS

French Search Report and Written Opinion for Application No. PCT/FR2011/051158 dated Dec. 23, 2011.

* cited by examiner

*Primary Examiner* — Jermie Cozart
(74) *Attorney, Agent, or Firm* — Jenkins, Wilson, Taylor & Hunt, P.A.

(57) ABSTRACT

A positioning device for assembling parts on a structure is disclosed. More specifically, the positioning device is designed for assembling fixed brackets to an aircraft structure. A laser projector is fastened directly on the rigid aircraft structure; its position is therefore stable in relation to the latter, even if the structure undergoes slight deformations. The position of the projector is determined accurately by utilizing targets, which are also fastened to the primary structure. A method for implementing the positioning device is also disclosed.

5 Claims, 2 Drawing Sheets

DEVICE FOR ASSEMBLING BRACKETS IN AN AIRCRAFT STRUCTURE

CROSS-REFERENCE TO RELATED APPLICATIONS

This application is a continuation of PCT Patent Application No. PCT/FR2011/051158 filed May 23, 2011 which claims the benefit of and priority to French Patent Application No. FR 10 54037, filed May 25, 2010, the entire disclosure of which is incorporated by reference herein.

TECHNICAL FIELD

The invention relates to a positioning device for assembling parts on a structure. More specifically, the invention relates to a positioning device designed for assembling fixed brackets on an aircraft structure.

BACKGROUND

The fixed brackets of an aircraft structure are used to position and support systems in said structure. These systems are paths for electrical cables or piping that transports various fluids, cabin fitting elements such as brackets for luggage racks or equipment.

These brackets are generally fastened to the structure of the fuselage by rivets or structural bonding. In the case of a commercial aircraft, such as a wide-body airplane, the number, kind and positioning of these brackets vary from one plane to another, depending on the fittings options chosen by the airline operating said aircraft. Accordingly, said brackets must be positioned and fastened on the structure upon request. The required positioning accuracy is of the order of one millimeter.

It is known from the prior art to use a laser projector to project the outline of said brackets onto the structure at their planned positions and in this way to facilitate the work of the team in charge of fastening said brackets to the aircraft's structure. These devices are, however, complicated to use and do not, in general, make it possible to achieve the required level of accuracy. The main difficulty is in obtaining a known and stable positioning of the projector within the aircraft structure. In effect, such a projector uses the information from a digital model, which comprises the geometric definition of the brackets as well as their position and orientation within the structure, to calculate the corrections required to the projection so that the projected outline is identical to the outline of the object to be positioned. These correction factors take into account, in particular, the exact distance from the focal point of the projection lens to the projection surface, and the angle between the optical axis and the normal to said surface. For this reason, these parameters must be perfectly known and able to be determined.

In addition, because the aircraft's structure at this stage of the assembly is bristling with structure elements such as frames, stringers or mountings, there are optimum positions of the projector that provide access to a maximum volume of visibility, i.e. these remarkable positions of the projector allow a maximum number of outlines to be projected on the structure without the beam being obscured by the elements making up said structure.

According to the prior art, the projector is placed on a tripod, often outside the structure, whose position in relation to this structure cannot be known accurately. In addition, this position is not stable. Consequently, the required accuracy cannot be achieved.

SUMMARY

To solve these shortcomings of the prior art, the invention proposes a positioning device for positioning a part for its assembly in an aircraft structure, comprising:
- a laser projector able to project an outline on a surface;
- a mount that fastens said projector to the aircraft structure in a defined position and orientation;
- a set of targets fastened to the aircraft structure within the projector's visibility space so as to locate the latter in relation to said structure.

Accordingly, since the projector is fastened directly to the rigid structure, its position is stable in relation to the latter, even if said structure undergoes slight deformations. The position of the projector is determined accurately by utilizing targets, which are also fastened to the aircraft structure.

This device can be implemented according to various advantageous embodiments, described below, which may be considered individually or in combination.

Advantageously, the set of targets comprises 6 targets positioned in centering holes or "datums", pre-drilled in elements that make up the aircraft structure. The position of these centering holes is identical for all structures of the same type. In this way, the installation is simplified and the variability of positioning is reduced. Using 6 targets allows complete positioning both as to position and orientation in the projector's space. It is thus possible to perform recalibration phases on these reference targets at regular intervals and occasionally if the laser beam was to be switched off.

The projector is advantageously fastened to the structure with a mount. Said mount is connected to the structure so as to be removable, advantageously by clamp-type clamping devices. To avoid damaging the structure when fastening the mount, these clamping devices are controlled by torque screws whose tightening torque is adjusted to ensure that the projector mount is immobilized without marking the structure elements at the tightening points.

Advantageously, the projector has a computer link to a computer, which computer contains the geometric definitions of the brackets to be projected and of the aircraft structure. In this way, a dialog is established between the projector and the computer to calculate the exact projection corrections according to the exact position of the projector within the aircraft structure's space.

The invention also concerns a method for assembling fixed brackets in an aircraft structure, which method advantageously utilizes the device described above and comprising the steps consisting of:
a. fastening the device according to any one of the embodiments described above to the aircraft structure;
b. determining the exact position of the projector within the space of the structure with the help of the targets;
c. projecting the outline of the brackets to be installed on the elements that make up the structure at their final position;
d. assembling the brackets on the structure at their position thus delimited.

This method makes it possible to fasten the brackets at precise positions, while significantly reducing the measurement time required for positioning these brackets.

Advantageously, the targets are fastened in step "a" to the structure elements in pre-drilled holes in said elements. In this way, the projector's calibration times are reduced.

Advantageously, when the brackets are assembled with rivet-type fasteners, the projection of step "c" comprises the position of the drillings to be realized in the structure element on which a bracket is fastened.

Advantageously also, the projection can comprise other items of information, such as an identification code for the bracket or elementary operating conditions relating to the installation of said bracket. These items of information are installation tips and telltale elements for the operator in charge of the installation. They allow the installation method to be made reliable and to increase its productivity.

Advantageously, before the projection step, computer processing of the geometric definition of the brackets and of the aircraft structure is realized based on data coming from a digital model, which processing comprises steps consisting of:

retrieving the geometric definition of the brackets and of their projection area in the structure, based on a digital model;

removing any information not relevant to fitting the brackets from the geometric definition of the brackets;

cleaning up the bracket's geometric definition file, which is used for the projection, so as to keep only the location of the holes allowing said brackets to be fastened and the shape of the bracket in contact with the structure element to which it is fastened.

This processing makes it possible to reduce the volume of data to be processed by the device and thus to project more positions of brackets to be installed simultaneously.

BRIEF DESCRIPTION OF THE DRAWINGS

The invention will now be described more precisely in the context of preferred non-limiting embodiments represented in FIGS. 1 to 5 in which.

DETAILED DESCRIPTION

Figure 1:
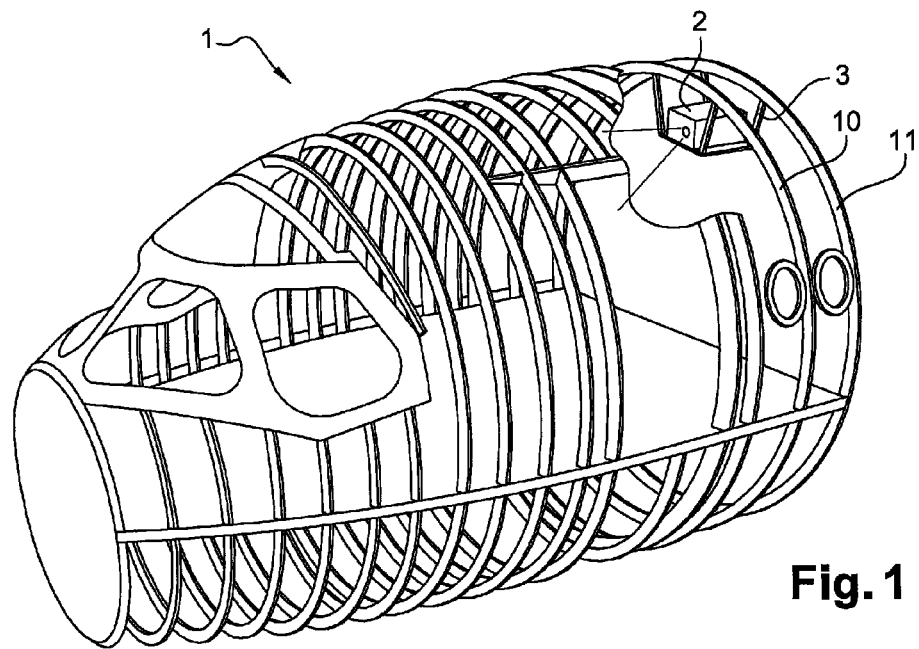
FIG. 1 is an exploded perspective view of an aircraft structure without its outer skin, in which a device according to a particular embodiment of the invention is installed.

FIG. 1: to locate the fastening positions of fixed brackets in an aircraft structure (1), e.g. in a nose cone, the invention proposes using a laser projector (2) able to project on the elements of said structure the outlines of the brackets to be installed thereon. The laser projector is fastened to the aircraft structure by means of a mount (3), which is preferably fastened so as to be removable, to rigid elements such as frames (10, 11) or other suitably rigid elements of the structure.

Figure 2:
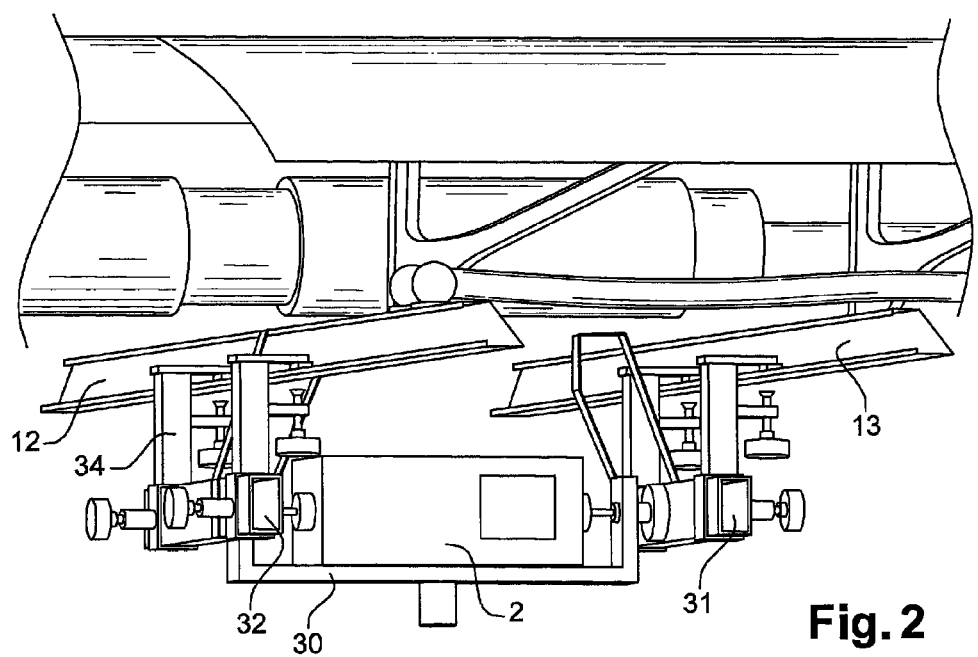
FIG. 2 is a detail view in perspective of the installation according to a particular embodiment of the device of the invention in an aircraft structure.

FIG. 2: according to a preferred embodiment, the projector mount (3) is made of a supporting platform (30), which is fastened to two parallel rails (31, 32) so as to be orientable; these rails are suspended to the primary structure by means of clamp-type devices (34) connected to structure elements (12, 13) by clamping.

Figure 3:
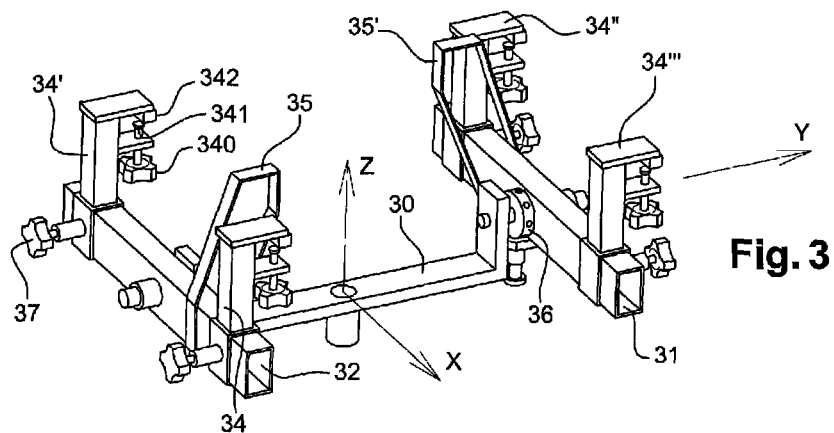
FIG. 3 shows in perspective a particular embodiment of the projector mount.

FIG. 3: according to this same embodiment, the projector mount also comprises two straps (35, 35') allowing its installation on the structure to be secured. The mount makes it possible to adjust the position of the projector in translation along X, by sliding the rails (31, 32) and to block this position by tightening the set screws (37). The adjustment of the position in translation along Y and in rotation about Z is obtained during the installation of the mount on the structure and the tightening of the clamping devices (34, 34', 34" and 34'") onto the structure elements. These clamping devices comprise two pads (341, 342) made of a material that is sufficiently soft not to mark the structure parts when tightened. As a non-limiting example, they can be made of polyoxymethylene, commercially available under the name Delrin®. One of the pads (341) is connected to a screw (340) that makes it possible when actioned to bring the two pads (341, 342) closer together and in this way to obtain the desired tightening. Advantageously, this screw is a torque screw, whose maximum tightening torque is adjustable by a friction device built into its control mechanism. Such torque screws are commercially available under the name Norelem®. The platform (30) has a Y-axis pivoting connection in relation to the rails by means of a pivot that can be blocked in rotation (36).

Figure 4:
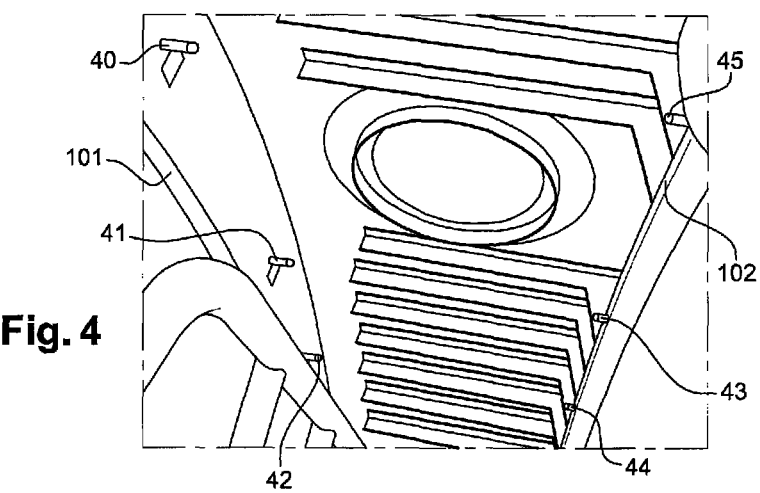
FIG. 4 illustrates in perspective the installation principle of the targets in holes pre-drilled in the structure elements.

FIG. 4: to find the exact position of the projector in the aircraft structure, targets (40 to 45) are fastened to said structure, preferably in pre-drilled holes in the frames (101, 102). The position of the projector within the space of the aircraft structure can thus be perfectly known by measuring the distance between the projector and each of these targets. This position and orientation information is utilized together with the geometric information coming from a digital model of the aircraft and from the definition of the brackets to calculate their exact position in the projector's reference space, as well as the optical corrections to be applied to the projections, such that the outline projected on each structure element receiving a bracket corresponds properly to the theoretical outline of the contact face of said bracket on this structure element.

Figure 5:
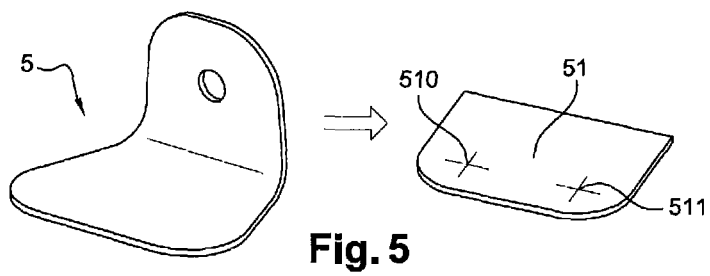
FIG. 5 illustrates the principle of computer processing of the geometric data relating to a bracket for realizing the projection of its outline on an element of the structure.

FIG. 5: the contact surface of the bracket (5) to be installed in the structure is determined based on the digital model of the aircraft structure and on the CAD definition of said bracket. Before its projection, the CAD entity that represents the bracket is reduced to a two-dimensional entity (51) oriented in space and corresponding to the contact face of said bracket on the structure element considered, as well as the location (510, 511) of any drillings. This reduced geometric definition is used by the projector and its software to project the outline (51).

The above description clearly illustrates that through its various features and their advantages the present invention realizes the objectives it set itself. In particular, it makes it possible to locate simply and accurately many fixed brackets in an aircraft structure for their assembly with this structure.

The invention claimed is:

1. A positioning device for positioning at least one bracket for assembly with an aircraft structure, the positioning device comprising:

a laser projector configured to project an outline of the at least one bracket on a surface of the aircraft structure;

a set of targets fastened to the aircraft structure within a visibility space of the laser projector so as to locate the laser projector in relation to the aircraft structure; and a mount for fastening the laser projector to the aircraft structure in a defined position and orientation, the mount comprising a supporting platform and at least one parallel rail suspended from the aircraft structure by clamping devices.

2. The device according to claim 1, wherein the set of targets comprises six targets positioned in centering holes pre-drilled in elements making up the aircraft structure.

3. The device according to claim 1, wherein the mount is removably fastened to the aircraft structure.

4. The device according to claim 2, wherein the mount is fastened to the aircraft structure with torque screws.

5. The device according to claim 1, comprising a computer with a computer link to the laser projector, the computer comprising a geometric definition of the at least one bracket to be projected and of the aircraft structure.

\* \* \* \* \*